(12) United States Patent
Edwards et al.

(10) Patent No.: US 6,714,132 B2
(45) Date of Patent: Mar. 30, 2004

(54) SELF-ACTIVATING SYSTEM AND METHOD FOR ALERTING WHEN AN OBJECT OR A PERSON IS LEFT UNATTENDED

(75) Inventors: William Christopher Edwards, Poquoson, VA (US); Terry L. Mack, Hampton, VA (US); Edward A. Modlin, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/011,229

(22) Filed: Nov. 27, 2001

(65) Prior Publication Data

US 2003/0098792 A1 May 29, 2003

Related U.S. Application Data

(60) Provisional application No. 60/329,692, filed on Oct. 11, 2001.

(51) Int. Cl.[7] .............................................. G08B 23/00
(52) U.S. Cl. .................... 340/573.1; 340/539; 340/457; 340/572.1
(58) Field of Search ............................. 340/573.1, 539, 340/571, 572.1, 457, 573.4, 825.69, 825.72; 342/458, 463

(56) References Cited

U.S. PATENT DOCUMENTS

| 5,229,975 A | 7/1993 | Truesdell et al. |
| 5,402,104 A | 3/1995 | LaRosa |
| 5,617,074 A | 4/1997 | White |
| 5,661,460 A | 8/1997 | Sallen et al. |
| 5,689,240 A | * 11/1997 | Traxler ..................... 340/573.1 |
| 5,793,291 A | 8/1998 | Thornton |
| 5,802,479 A | 9/1998 | Kithil et al. |
| 5,825,283 A | 10/1998 | Camhi |
| 5,939,988 A | 8/1999 | Neyhart |
| 5,949,340 A | 9/1999 | Rossi |
| 5,966,070 A | 10/1999 | Thornton |
| 6,028,537 A | 2/2000 | Suman et al. |
| 6,075,443 A | 6/2000 | Schepps et al. |
| 6,084,517 A | 7/2000 | Rabanne et al. |
| 6,104,293 A | * 8/2000 | Rossi ....................... 340/573.1 |
| 6,127,931 A | 10/2000 | Mohr |
| 6,211,790 B1 | 4/2001 | Radomsky et al. |
| 6,265,974 B1 | 7/2001 | D'Angelo et al. |
| 6,282,473 B1 | 8/2001 | Steffens, Jr. |
| 2003/0062996 A1 | * 4/2003 | Flanagen et al. ........... 340/457 |

* cited by examiner

*Primary Examiner*—Julie Lieu
(74) *Attorney, Agent, or Firm*—Kurt C. Hammerle

(57) ABSTRACT

A system and method uses a wireless tether comprising a transmitter and a receiver to alert a caregiver that an object or person has been left unattended. A detector senses the presence of the object, usually a child, located in a position such as a safety seat. The detector couples to the transmitter, which is located near the object. The transmitter transmits at least one wireless signal when the object is in the position. The receiver, which is remotely located from the transmitter, senses the at least one signal as long as the receiver is within a prescribed range of transmission. By performing a timing function, the receiver monitors the proximity of the caregiver, who maintains possession of the receiver, to the transmitter. The system communicates an alarm to the caregiver when the caregiver ventures outside the range of transmission without having removed the object/child from the position.

46 Claims, 12 Drawing Sheets

SELF-ACTIVATING SYSTEM AND METHOD FOR ALERTING WHEN AN OBJECT OR A PERSON IS LEFT UNATTENDED

Pursuant to 35 U.S.C. §119, the benefit of priority from provisional application No. 60/329,692, with a filing date of Oct. 11, 2001, is claimed for this non-provisional application.

ORIGIN OF THE INVENTION

The invention was made with Government support under contract NAS1-00135 awarded by NASA. The Government has certain rights in this invention.

BACKGROUND OF THE INVENTION

FIELD OF THE INVENTION

This invention relates to proximity sensing systems. More specifically, the invention is a self-activating system that alerts someone when an object or a person is left unattended in a motor vehicle or other dangerous environment.

SUMMARY OF THE INVENTION

In accordance with the present invention, a self-activating system is provided for alerting someone that an object or person has been left unattended as is the case when a child is left restrained or unattended in a car seat. The system includes a detector for sensing the presence and/or absence of the child in the car seat. Coupled to the detector is a transmission means for automatically transmitting one of a plurality of unique wireless signals. For example, the plurality of wireless signals may include a first signal when the child is in the car seat and a second signal when the child is removed from the car seat. Remotely located with respect to the transmission means is a receiving means capable of sensing the plurality of wireless signals, including the first signal and the second signal. The receiving means is possessed by the parent or other responsible caregiver who is also generally the driver of the vehicle in which the car seat is located. The receiving means is programmed to carry out a plurality of timing functions including a first timing function and a second timing function. The first timing function is enabled when the first signal is initially sensed. Once enabled, the first timing function times to a first interval or intervening period of time. At the completion of each first interval, the receiving means can implement a variety of actions. Specifically, the receiving means (i) continues the first timing function if the first signal is sensed indicating that the receiver is still in proximity to the child in the car seat; (ii) disables the first timing function if the second signal is sensed indicating that the child has been removed from the car seat; or (iii) enables the second timing function if neither of the first signal nor the second signal is sensed. The second timing function indicates that the responsible caregiver possessing the receiving means has ventured outside the range of the transmission means while the child is still located in the car seat. If enabled, the second timing function times to a second interval having a first time and a later second time. The receiving means issues a first alarm signal at the first time if neither the first nor second signal is sensed. However, the receiving means discontinues the first alarm signal if the first signal is sensed during the second interval indicating that the responsible caregiver (possessing the receiving means) has returned within the range of the transmission means while the child is still located in the car seat. Further, the receiving means issues a second alarm signal if the first signal is not sensed during the second interval. The second alarm signal is allowed to continue after the second time until the second signal is sensed. That is, the second alarm signal continues until the responsible caregiver (possessing the receiving means) has returned to the vicinity of the transmission and the child is removed from the car seat.

DETAILED DESCRIPTION OF THE INVENTION

Figure 1:
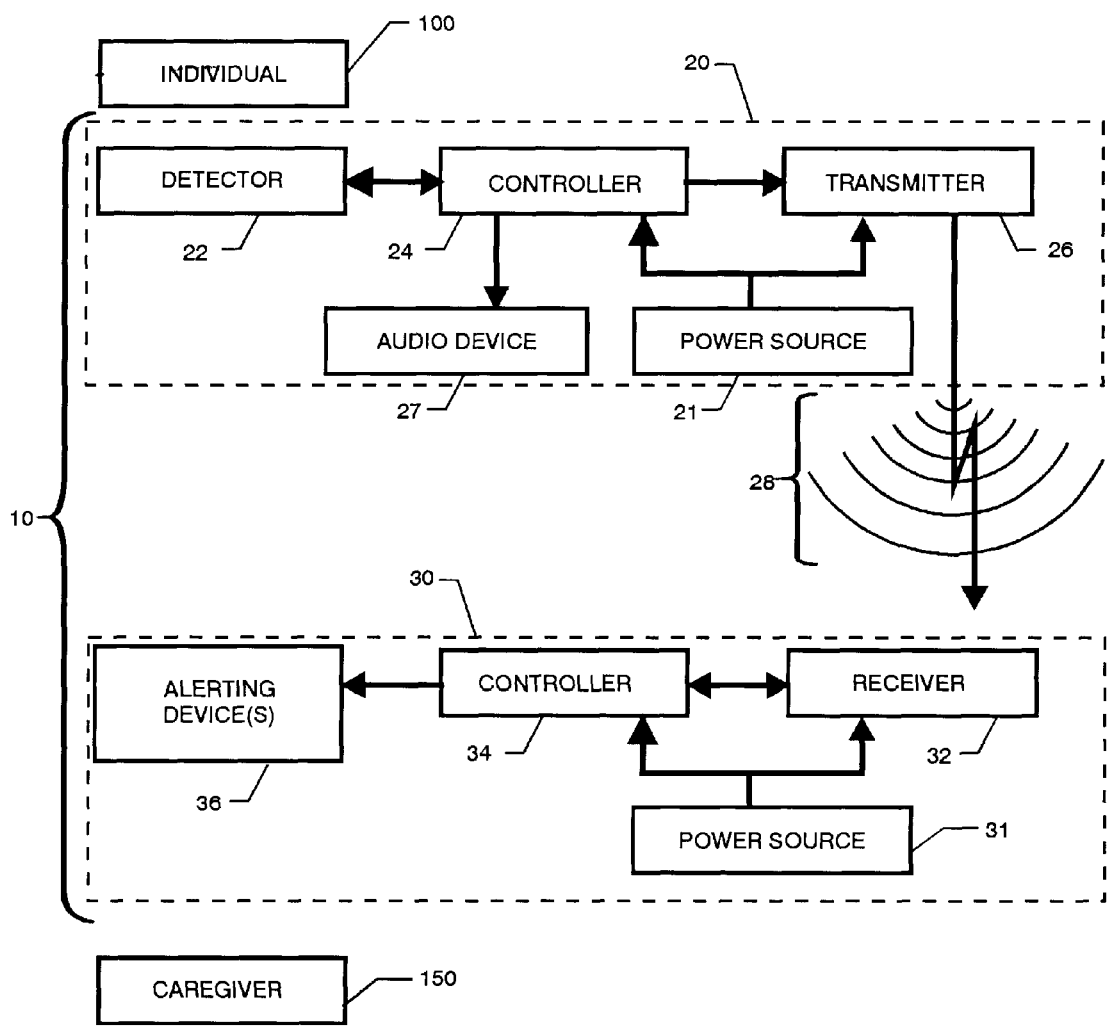
FIG. 1 is a schematic block diagram of a self-activating system for alerting a caregiver that a child has been left unattended in a vehicle in accordance with an embodiment of the present invention.

Referring now to the drawings, and more particularly to FIG. 1, a schematic block diagram of a self-activating system of the present invention that provides an alerting or alarm signal when an object or person has been left unattended is shown and referenced generally by numeral 10. By way of illustrative example, the present invention will be explained as a system for alerting a parent or other caregiver that a child has been left unattended in a safety seat within a vehicle. However, as will be apparent from the following, it is to be understood that the present invention can be used to provide an alarm signal when any object, or a restrained or otherwise immobilized individual, has been left unattended in any position.

Figure 2:
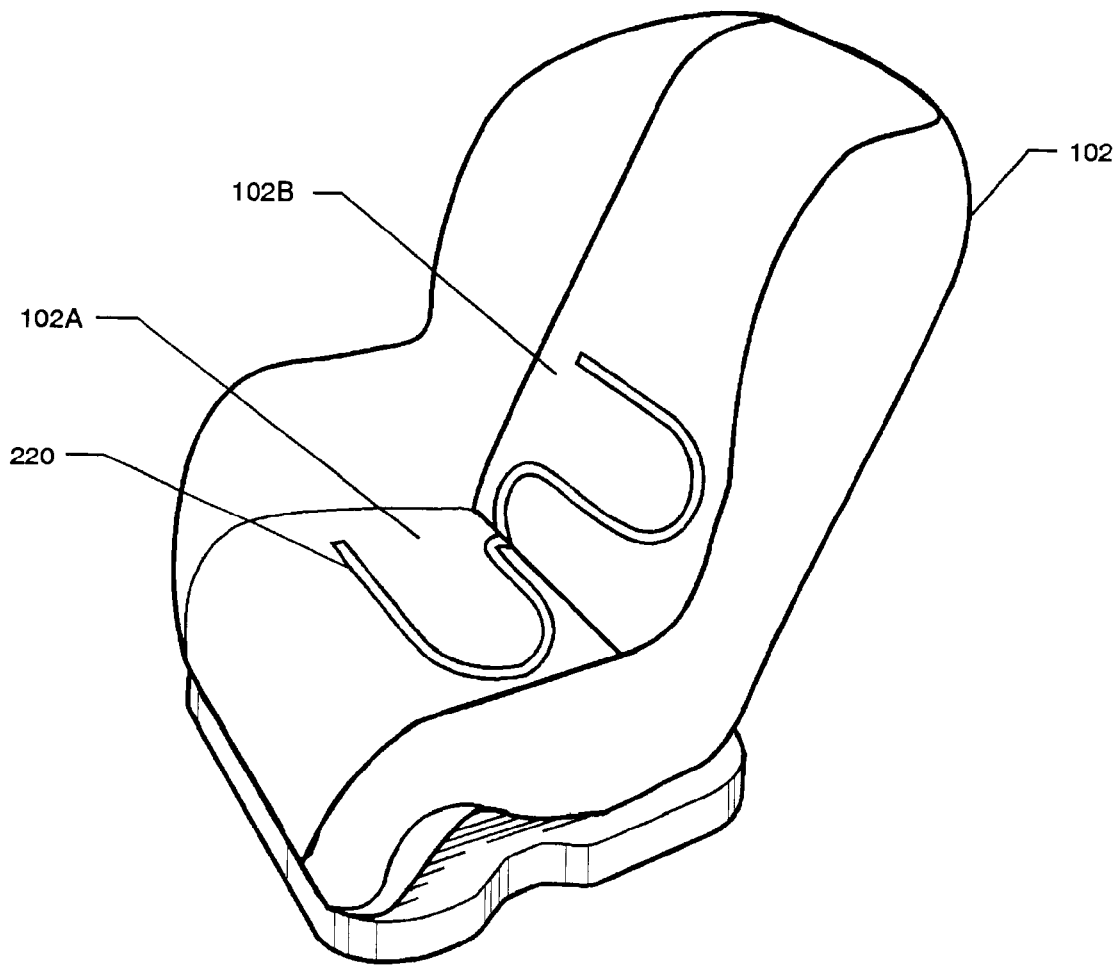
FIG. 2 is a perspective view of a child safety seat with a pressure switch attached to its seat and back areas to serve as a detector for the presence of a child in accordance with an embodiment of the present invention.

System 10 includes a transmission portion 20 and a reception portion 30. Transmission portion 20 remains at a position close to where the individual (or object) 100 has been left. In terms of the illustrated example, individual 100 is a child positioned and restrained in a safety seat 102 as shown in FIG. 2. Accordingly, transmission portion 20 is located on or near the seat 102. Reception portion 30 is possessed by someone responsible for individual 100. Again, in terms of the illustrative example, reception portion 30 is maintained by the parent or caregiver 150 having responsibility for individual 100. Typically, the caregiver 150 would be the driver of the vehicle that individual 100 is in. Because it is important for the caregiver 150 to maintain possession of reception portion 30, reception portion 30 may be attached to or kept with the motor vehicle's key, such as, for example, a key ring. This arrangement will work in the vast majority of situations as it is presumed that the motor vehicle key will be retained at all relevant times by caregiver 150 who is responsible for individual 100.

Transmitter portion 20 includes a detector 22 for monitoring or sensing the presence or absence of individual 100, a controller 24 coupled to detector 22 for "reading" the state of detector 22 and sending an activating signal, and a transmitter 26 coupled to and controlled by controller 24 for transmitting a plurality of unique wireless signals 28. Transmission portion 20 will typically have its own replaceable power source 21 such as a battery to power appropriate components in transmission portion 20. Transmission portion 20 may include a device that can provide a caregiver with an indication that transmitter portion 20 is working and that power source 21 has sufficient power capability. For example, transmitter portion 20 can include an audio device 27 to provide an audible indication each time detector 22 initially senses the presence of individual 100 and when individual 100 is no longer sensed by detector 22. Audio device 27 could also be used to provide an audible alarm when it is time to replace power source 21.

Detector 22 comprises any type of device that senses the presence and absence of individual 100. For instance, the detector 22 may comprise a mechanical switch, an optical detector, a heat detector, a sonar detector, a motion detector, or a weight or pressure detector. For purposes of the illustrated example, FIG. 2 shows that detector 22 may be realized by a tape pressure switch 220 that attaches to the safety seat 102 (the padded cover and restraining belts/straps of which are not shown for clarity of illustration) along both its seat support area 102A and its back support area 102B. Tape pressure switch 220 is normally an open switch that closes when there is pressure against any portion thereof. Such tape pressure switches are well known in the art. In terms of placement, tape pressure switch 220 could be serpentined across seat area 102A and back area 102B. The advantage of having switch 220 span both seat area 102A and back area 102B is that switch 220 will close and remain closed even if the individual 100 becomes fidgety. Although only one switch 220 is shown, more than one pressure switch could be used without departing from the scope of the invention.

Controller 24 is a programmable microprocessor-based device that institutes its processing steps predicated on the state of detector 22, i.e., switch 220 is open indicating no child is in the car seat or switch 220 is closed indicating that a child is in the car seat. Controller 24 processes the state of detector 22 and issues control signals to transmitter 26. The control signals activate and/or deactivate transmitter 26 and control the type of wireless signal 28 that will be transmitted.

Transmitter 26 is any omnidirectional wireless transmitter that can output a plurality of unique wireless signals 28 such as radio frequency (RF) signals. The particular unique wireless signal is, at any given time, dictated by controller 24. The strength of wireless signals 28 should be such that they are only detectable (by reception portion 30) over a predetermined range. For the illustrative example, the predetermined range of transmission is on the order of approximately 10–20 feet for reasons that will be explained further below. The uniqueness of wireless signals 28 can be achieved by using different frequencies for each signal, or otherwise uniquely encoding (e.g., frequency shift keying, modulation, pulse width, bit phase shift keying, manchester coding, etc.) each signal. Such encoding and transmitting techniques are well known in the art of wireless tethers and include the techniques and system disclosed in U.S. Pat. No. 6,075,443, which is hereby incorporated by reference. Alternatively, wireless signals which are not unique or encoded may also be used.

Reception portion 30 includes a receiver 32 for receiving transmission of wireless signals 28 provided receiver 32 is within the afore-mentioned predetermined range of transmitter 26, a controller 34 coupled to receiver 32, and one or more alerting device(s) 36 coupled to controller 34. Reception portion 30 will typically have its own replaceable power source 31 such as a battery to power each appropriate component in reception portion 30. The reception portion 30 may also include an alarm reset to allow the caregiver to reset the unit. This reset enables one caregiver to reset their alarm if another caregiver (having his own reception portion) remains with the child.

Alerting device(s) 36 are activated and/or deactivated by controller 34 and can include one or more of an audio producing device such as a voice generator or a beeper, a visual device such as flashing lights, or a tactile device such as a vibrator, etc. In the illustrative example, alerting device(s) 36 would, at a minimum, include an audio producing device.

Controller 34 is a programmable microprocessor-based device that institutes its processing steps predicated on the unique nature of wireless signal 28 received by receiver 32. Receiver 32/controller 34 use such receiving and decoding techniques as are well known in the art of wireless tethers. Such techniques include the system disclosed in the U.S. Pat. No. 6,075,443, which is hereby incorporated by reference. Controller 34 then issues control signals to alerting device(s) 36 to activate or deactivate the same.

By way of non-limiting illustrative examples, the present invention will be explained using two and three unique wireless signals transmitted by transmitter 26. Processing based on the use of two signals will first be explained with the aid of FIGS. 3 and 4 where FIG. 3 depicts the operation of transmission portion 20 and FIG. 4 depicts the operation of reception portion 30.

Figure 3:
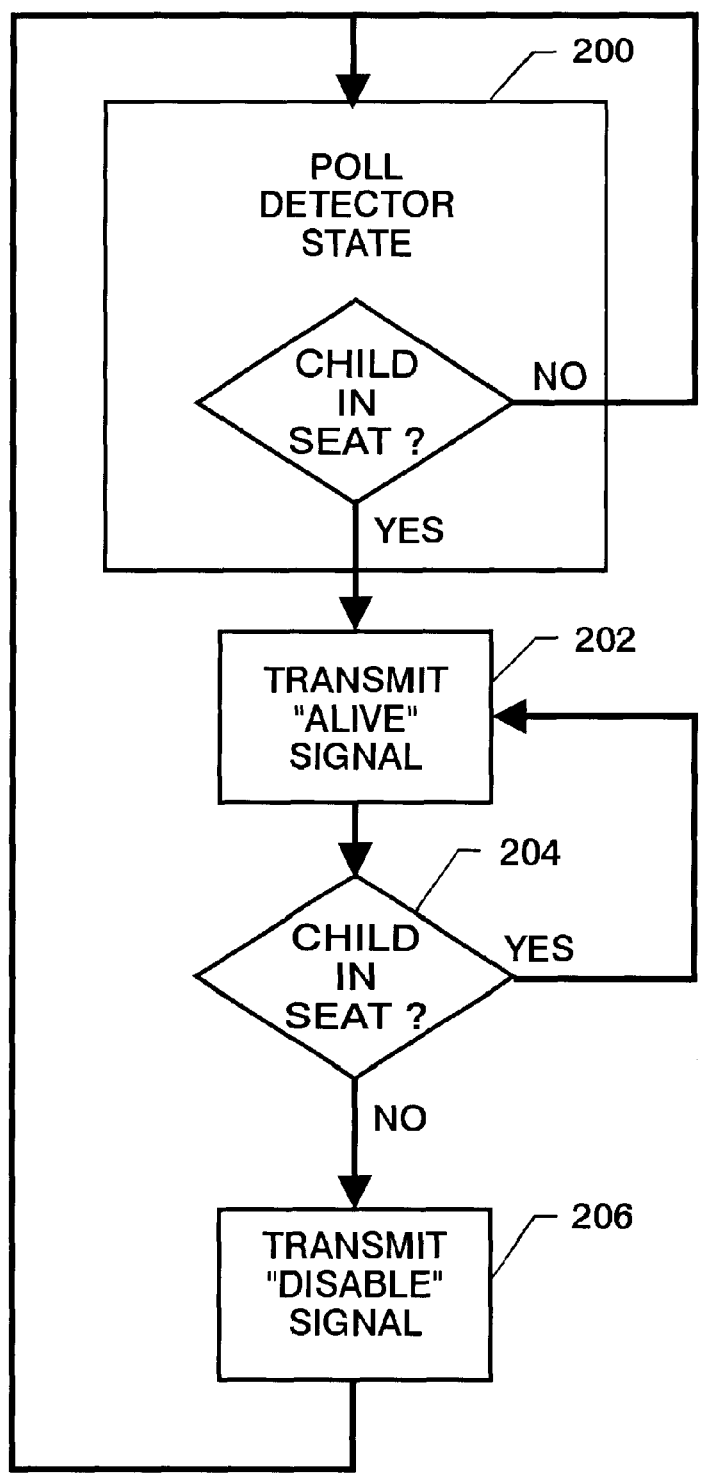
FIG. 3 is a flow diagram depicting the basic steps for the transmission portion of the system when two unique wireless signals are used in accordance with one embodiment of the present invention.

Referring first to FIG. 3, controller 24 continuously or periodically (i.e., to save battery power) polls the state of detector 22 at step 200. Specifically, the presence or absence of a child in the car seat is determined. If the child is present, controller 24 instructs transmitter 26 to transmit an ALIVE signal. This instruction can be issued continuously or periodically (i.e., again to save battery power) at step 202. Once the ALIVE signal has been transmitted, detector 22 is again checked at step 204. If the child is still in the car seat, the ALIVE signal is continuously or periodically transmitted again. If, however, the child has been removed from the car seat, controller 24 instructs transmitter 26 to transmit a DISABLE signal at step 206 and transmission control returns to step 200.

Figure 4:
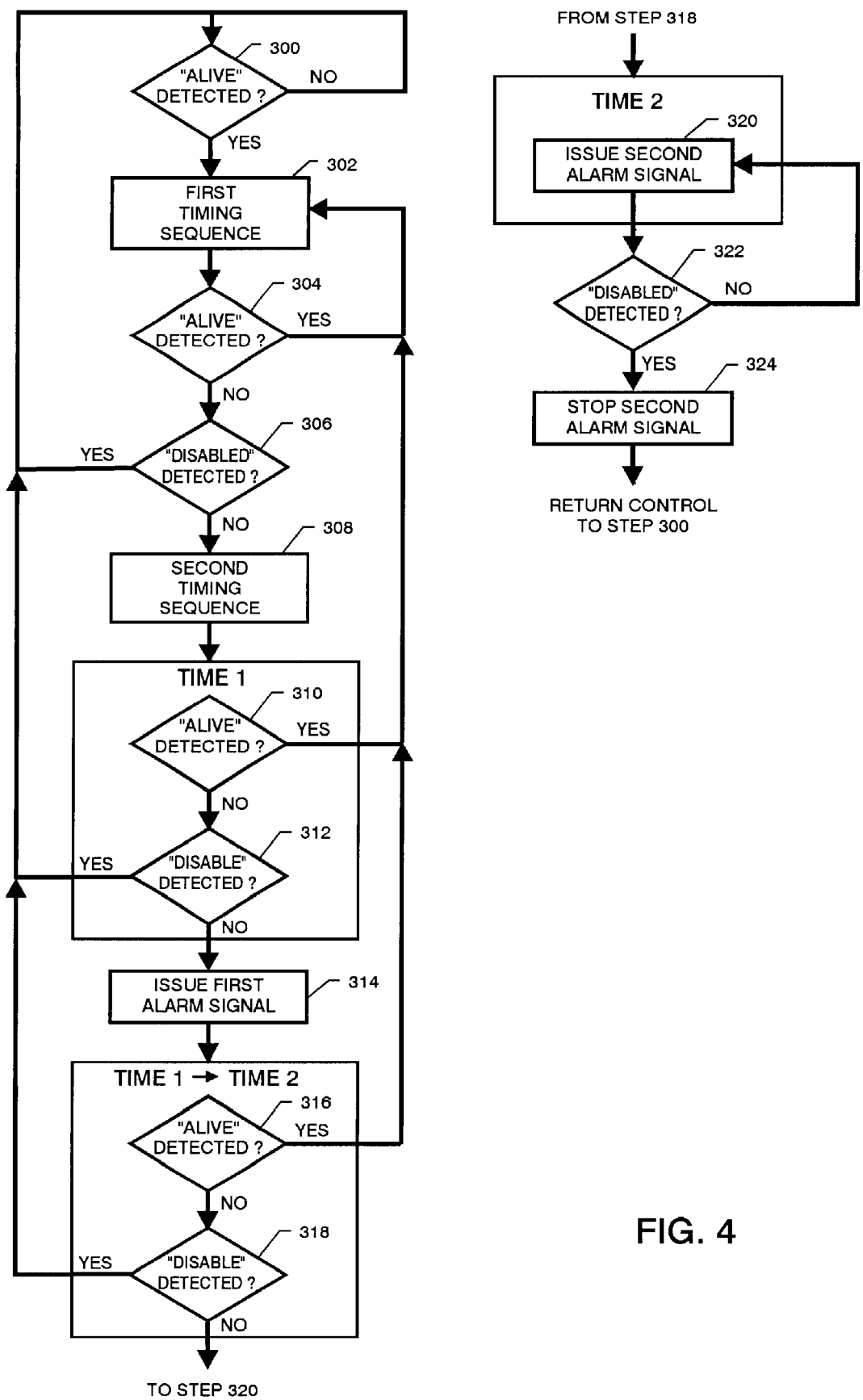
FIG. 4 is a flow diagram depicting the basic steps for the reception portion of the system when two unique wireless signals are used in accordance with one embodiment of the present invention.

Referring now to FIG. 4, receiver 32/controller 34 work together continuously or periodically to check for an ALIVE signal at step 300. If no ALIVE signal is detected, the main processing steps of reception portion 30 remain inactive. Initial detection of the ALIVE signal (i.e., child placed in the safety seat 102) enables a first timing sequence having a first interval of time at step 302. At the conclusion of the timing sequence (e.g., on the order of 10–60 seconds) receiver 32/controller 34 operate to check for an ALIVE signal at step 304 and DISABLE signal at step 306. Detection of an ALIVE signal (indicating that the child is still in the seat 102) causes the timing sequence in step 302 to repeat itself. This repeated sequence essentially means that the child is in the car seat and reception portion 30 (in possession of the caregiver 150) is within the predetermined range (e.g., 10–20 feet) of the car seat. On the other hand, detection of a DISABLE signal (indicating that the child is now out of the car seat) returns the controller 34 to step 300. If neither the ALIVE or DISABLE signal is detected at the completion of the step 302 timing sequence, a second timing sequence is initiated at step 308. This second timing sequence essentially means that the child is in the car seat, but that reception portion 30 is no longer in range to receive the ALIVE signal. Assuming that the caregiver 150 has maintained possession of the reception portion 30, this circumstance also indicates that the caregiver 150 is no longer in the vicinity of the safety seat. Therefore, the controller 34 is passed on to step 308, which is the beginning of the second timing sequence.

Step 308 times to a first time (TIME 1) and then to a later second time (TIME 2). For example, TIME 1 could occur at 1 minute and TIME 2 could occur at 2 minutes. At TIME 1, if either the ALIVE or DISABLE signals are detected at steps 310 and 312, respectively, the controller 34 returns to steps 302 or 300, respectively. However, if neither of these signals is detected (indicating that reception portion 30 remains beyond the predetermined transmission range capability of transmission portion 20), a first alarm signal is issued at step 314. In terms of system 10, controller 34 issues a control signal to alerting device(s) 36 to produce a first alarm in correspondence with the first alarm signal. The first alarm serves as a pre-warning to the possessor of reception portion 30 that he (the caregiver 150) is out of range of transmission portion 20 during the time that reception portion 30 is activated. That is, the first alarm indicates that the possessor of reception portion 30 has left the vicinity of the vehicle while the child has been left in the car seat. The pre-warning could, for example, be a series of audible beeps, blinking lights, or vibrations issued by alerting device(s) 36. Alternately, alerting device 36 may comprise a voice generator that generates a voice message such as "RETURN TO CAR!" or "REMOVE CHILD FROM SEAT!"

As second timing sequence step 308 continues timing to TIME 2, the first alarm signal is issued while reception portion 30 continuously or periodically looks for an ALIVE or DISABLE signal at steps 316 and 318, respectively. Detection of a respective one of these signals indicates that the possessor of reception portion 30 is again within the predetermined range of transmission portion 20, i.e., the caregiver 150 has returned to the vicinity of the vehicle. When this event occurs, the first alarm signal is discontinued as the controller 34 is returned to the appropriate one of steps 302 or 300. However, if neither of the ALIVE or DISABLE signals is detected (again indicating that reception portion 30 is beyond the predetermined transmission range of transmission portion 20), a second alarm signal is issued at TIME 2 at step 320. In terms of system 10, controller 34 issues a control signal to alerting device(s) 36 to produce a second alarm in correspondence with the second alarm signal. The second alarm could be the same or different than the first alarm. The second alarm continues until a DISABLE signal is detected at step 322, at which point the second alarm signal is stopped at step 324 and control is returned to step 300. Essentially, processing step 320 is only executed if the possessor of reception portion 30 did not return to the vicinity of the vehicle in response to the (pre-warning) first alarm signal.

Figure 5:
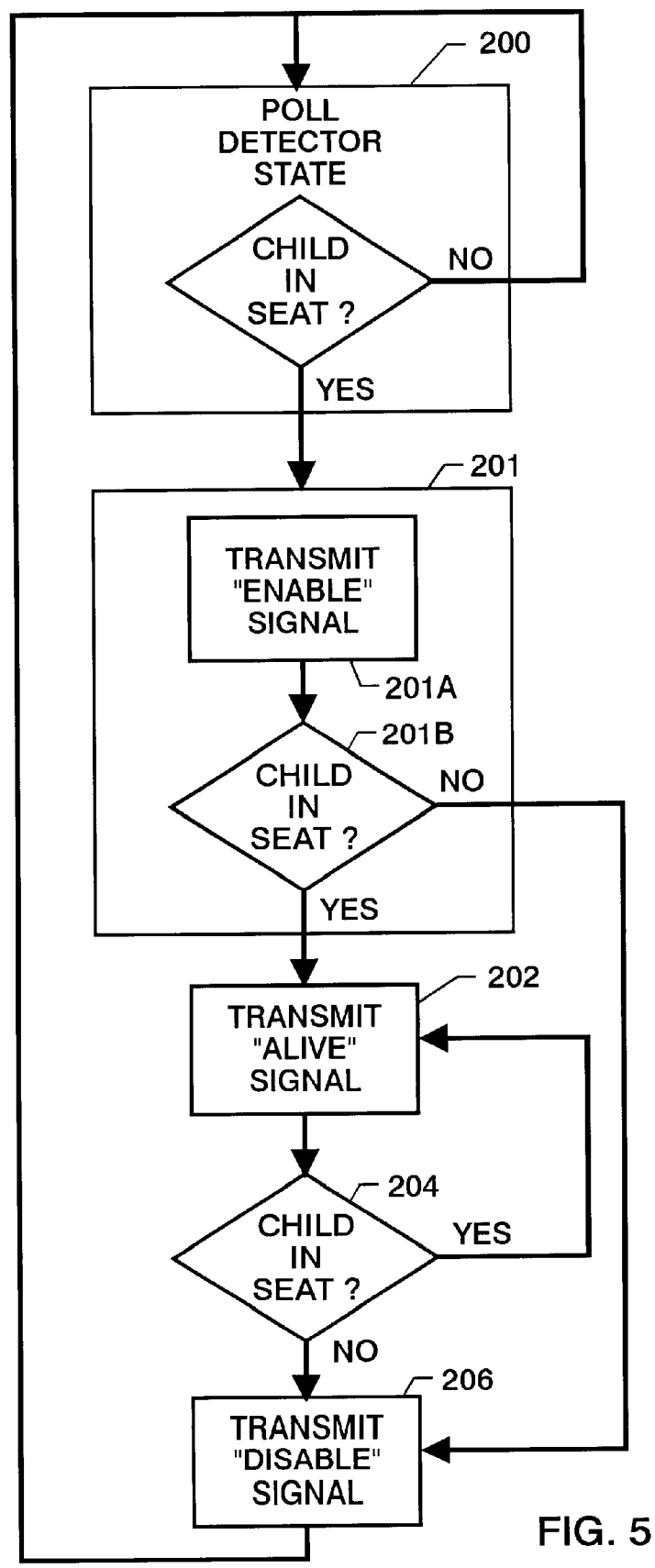
FIG. 5 is a flow diagram depicting the basic steps for the transmission portion of the system when three unique wireless signals are used in accordance with another embodiment of the present invention.
Figure 6:
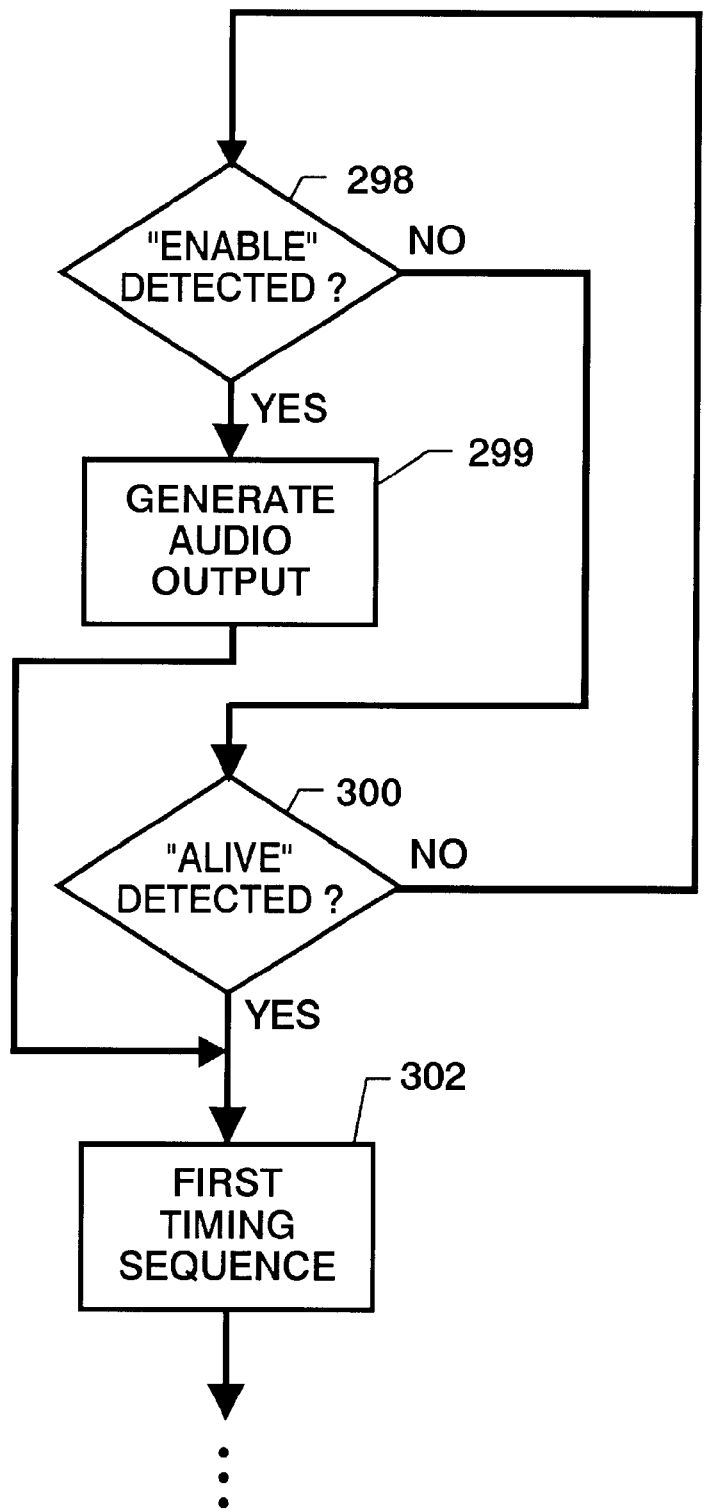
FIG. 6 is a portion of the flow diagram depicting the additional steps for the reception portion of the system when three unique wireless signals are used in accordance with another embodiment of the present invention.

As mentioned above, the present invention can also be based on the use of three unique wireless signals where the addition of a brief ENABLE signal is used in conjunction with the above-described ALIVE and DISABLE signals. The processing steps implementing the transmission portion of this embodiment are depicted in FIG. 5 and the processing steps implementing the reception portion of this embodiment are depicted in FIG. 6. Processing steps that remain unchanged are tagged with the same reference numerals and will not be described further.

In FIG. 5, processing steps 201 are carried out after the above-described step 200. Specifically, when a child is first detected in the car seat, an ENABLE signal (e.g., a brief pulse) is transmitted at step 201A. Then, periodically or continuously, the car seat's detector is again polled at step 201B. Presence of the child causes transmission of the ALIVE signal at step 202 whereas absence of the child causes transmission of the DISABLE signal at step 206 with control then being returned to step 200.

The inclusion of processing steps 201 at transmission portion 20 results in the addition of steps 298 and 299 in reception portion 30 as illustrated in FIG. 6. Specifically, reception portion 30 continuously or periodically looks for an ENABLE signal at step 298. If present, an audio output at transmission portion 20 can be generated by audio device 27 at step 299. Control is then passed to step 302 and processing continues as described previously in FIG. 4. However, recognizing that a child can be placed in the car seat before the reception portion 30 comes within range (e.g., reception portion 30 is in the house or with the other parent when the child is placed in the car seat), lack of detection of the ENABLE signal at step 298 transfers the controller 34 to step 300 and processing continues as described previously.

The present invention can also be based on the use of one unique wireless signal wherein only the above-described ALIVE signal is transmitted. The processing steps implementing the transmission portion of such a single-signal system would be similar to the processing steps depicted in FIG. 3, but the step of transmitting a DISABLE signal would be eliminated. In the same way, the processing steps implementing the reception portion of such a single-signal system would be similar to the processing steps depicted in FIG. 4, but the steps of checking for a DISABLE signal would be eliminated.

Operation of the system enables a self-activating method for alerting a caregiver that a child has been left unattended in a child safety seat. The system continuously or periodically monitors the safety seat and automatically (by itself) activates once the child is placed in the seat. Then, as long as the caregiver 150 is in possession of the reception portion 30 and remains in close proximity to the transmitter which is located at or near the seat, no alarm is sounded. In other words, the caregiver 150 is wirelessly tethered by the system 10 by the act of maintaining the reception portion 30 in the vicinity of caregiver 150. In one embodiment, once the child is placed in the seat and the system is activated, the caregiver 150 can only leave the vicinity (of the child safety seat) for a brief period of time before a pre-warning alarm is issued to encourage the caregiver to return immediately to the vehicle. If the caregiver does not respond quickly enough, a second alarm is issued and will continue until the caregiver (in possession of the reception portion of the system) returns and the child is removed from the seat.

Alternatively, the function of communicating an alarm to the caregiver may be performed with a system 10 that communicates only one alarm to the caregiver (without providing a pre-warning alarm as just described) once the caregiver is beyond a predetermined distance from the child. With such a system, the single alarm may be deactivated in the same manner described earlier for either the first or second alarm. In other words, the single alarm may be deactivated by having the caregiver 150 return within the range of transmission of the transmitter 26. In another embodiment, the single alarm may be deactivated only by having the child removed from the safety seat.

The present invention can be constructed with inexpensive, commercially-available components that are both small in size and of low power consumption. A child safety seat and vehicle need not be functionally or materially altered to install the system of the present invention. Thus, the present invention may be installed with any existing or new safety seat and/or vehicle.

Numerous variations and modifications will be readily apparent to those skilled in the art in light of the above teachings. For example, additional audio tones or voice messages can be used at both the transmission and reception portions to indicate that the system has been activated, periodically indicate that the system is still activated, or indicate that the system has been deactivated. In one embodiment, the alerting device 36 may include a voice generator (not shown) that generates such voice messages as "ACTIVATED," "WORKING," and "DEACTIVATED." Still other audible alarms or voice messages can be provided to indicate that respective power sources 21 and 31 need to be replaced. In another embodiment, a watch dog circuit may be combined with a wake-up circuit to turn off the alarm of the reception portion after sounding for a sufficiently long period of time, thereby avoiding a substantial draining of a power source such as a replaceable battery.

Similarly, while the illustrated example of FIG. 1 and the preceding detailed description has discussed a system 10 and a method for "a caregiver," "a child," and "a safety seat," it should be understood that the system and method may also encompass a plurality of children that are each located in a different safety seat within the same vehicle or a plurality of caregivers. Likewise, while the system 10 has been described as having "a detector," "a transmission portion," or "a reception portion," the specification and appended claims are to be understood as encompassing systems and methods comprising more than one detector, one transmission portion, or one reception portion. For example, if more than one reception portion is used (i.e. two caregivers are responsible for one child), each reception portion may include an alarm reset to enable one caregiver to reset their unit while the other caregiver remains with the child.

Figure 7A:
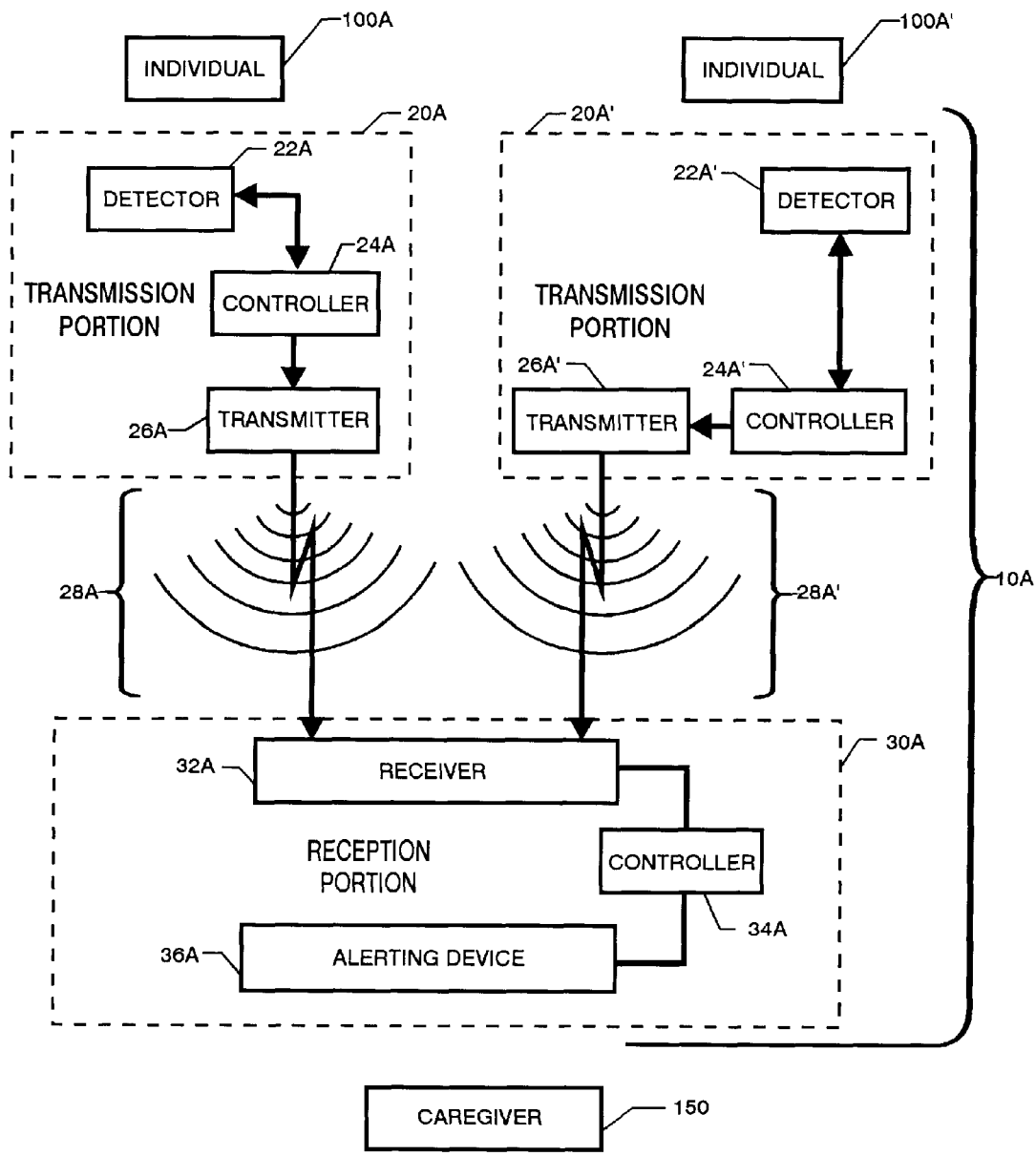
FIG. 7A is a schematic block diagram of a self-activating system for alerting a caregiver that at least one child has been left unattended in at least one child safety seat in accordance with another embodiment of the present invention.
Figure 7B:
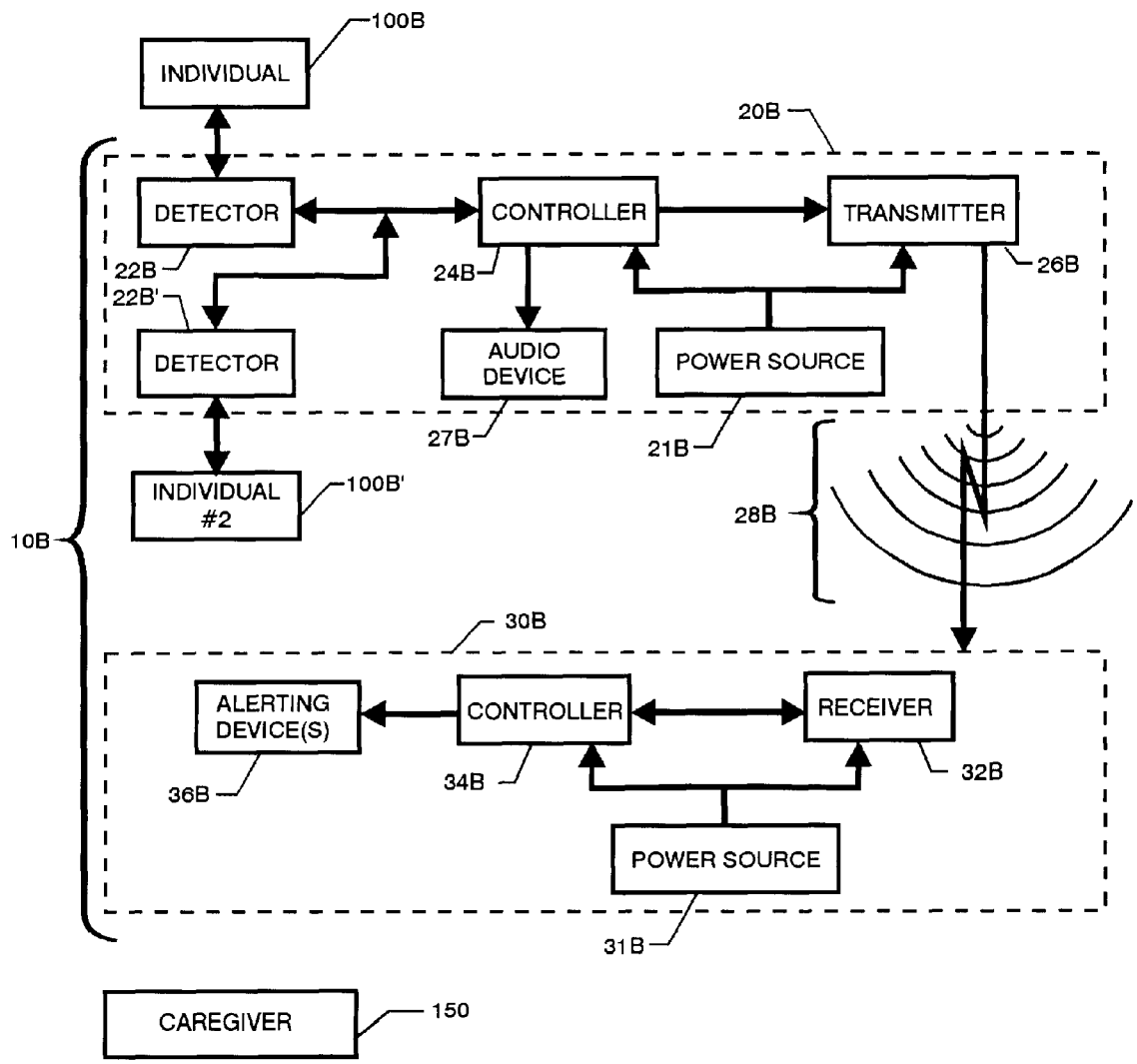
FIG. 7B is a schematic block diagram of a self-activating system, having two detectors, for alerting a caregiver that at least one child has been left unattended in at least one child safety seat in accordance with another embodiment of the present invention.

Examples of such systems and methods are illustrated in FIGS. 7A and 7B. Both system 10A of FIG. 7A and system 10B of FIG. 7B encompass a scenario wherein one caregiver 150 is responsible for two individuals (children) each positioned in a different safety seat. Components of system 10A and system 10B that remain substantially unchanged from the previous description are tagged with similar reference numerals. For instance, reception portion 30A comprises similar components and operates in a similar manner to reception portion 30.

System 10A, as shown in FIG. 7A, comprises two transmission portions 20A and 20A' including two detectors 22A and 22A', two transmission controllers 24A and 24A', and two transmitters 26A and 26A', respectively. Transmitter 26A sends a plurality of wireless signals 28A, whereas transmitter 26A' sends a second plurality of wireless signals 28A'. Reception portion 30A includes a receiver 32A, a controller 34A, and an alerting device 36A.

Referring now to FIG. 7B, system 10B comprises two detectors 22B and 22B', one transmitter controller 24B, and one transmitter 26B. Transmitter 26B transmits a plurality of wireless signals 28B. Reception portion 30B includes a receiver 32B, a controller 34B, and an alerting device 36B.

The critical difference between the system 10 previously described and the two alternative embodiments 10A and 10B is that the alternative embodiments transmit a set of signals for each safety seat being monitored, thereby requiring a slightly different set of signal-processing techniques than the techniques presented previously in FIGS. 3 and 4. This different set of signal-processing techniques is necessary because system 10A and system 10B should activate when either one or both seats are occupied and should deactivate only when both seats are unoccupied.

Accordingly, transmission portions 20A, 20A', and 20B differ slightly from the previously described transmission portion 20. First, transmitter controllers 24A, 24A', and 24B each send an ALIVE signal to transmitters 26A, 26A', and 26B, respectively, when either one or both safety seats are occupied. Controllers 24A, 24A', and 24B also send a DISABLE signal to transmitters 26A, 26A', and 26B, respectively, when a seat is unoccupied. Likewise, reception portions 30A and 30B differ from the previously described reception portion 30 in that receiver controllers 34A and 34B send a deactivating signal to the alerting device 36A and 36B, respectively, only when both monitored safety seats are unoccupied.

Figure 8:
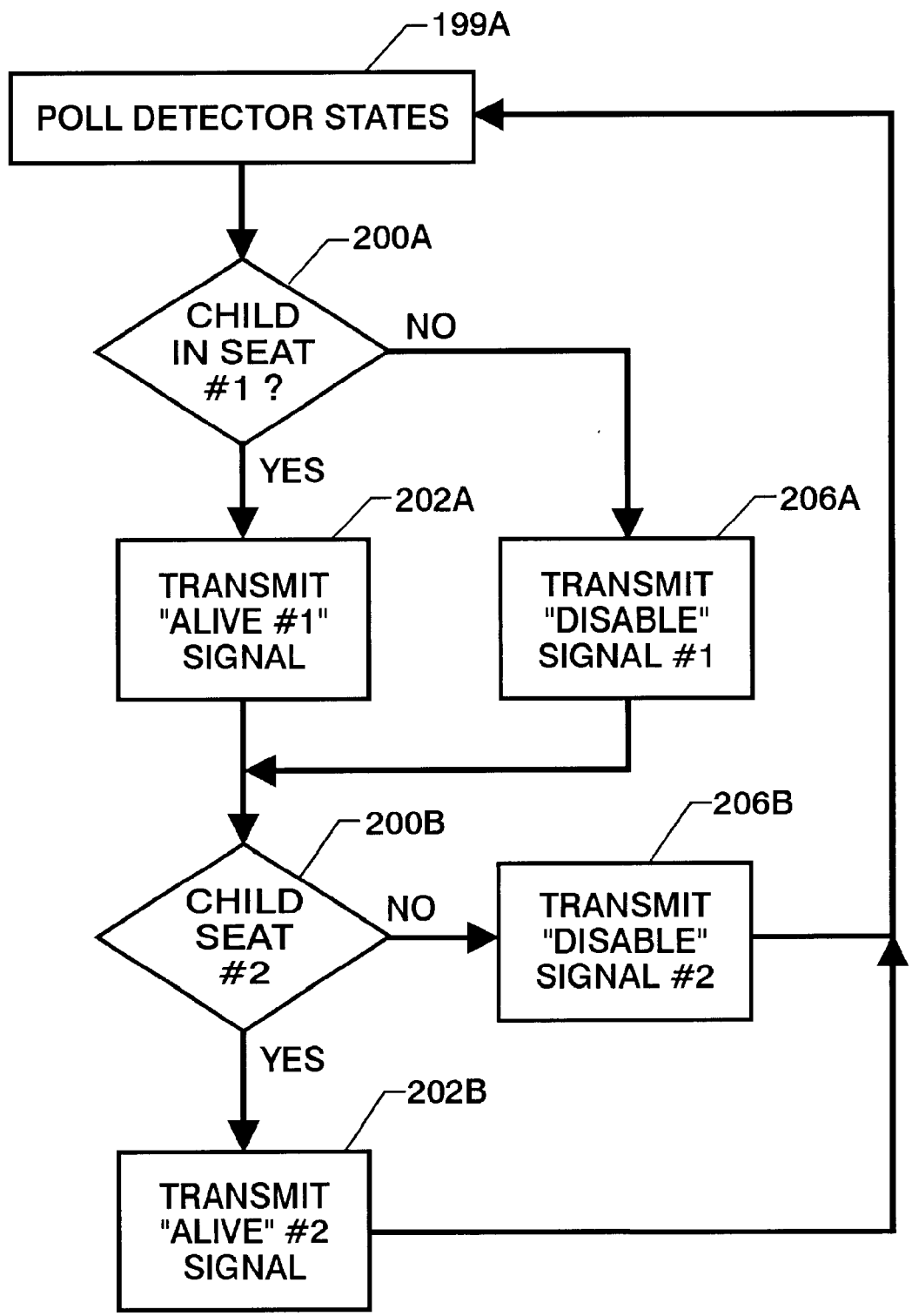
FIG. 8 is a flow diagram depicting the basic steps carried out by the transmission portion of a system when two child safety seats are being monitored.
Figure 9A:
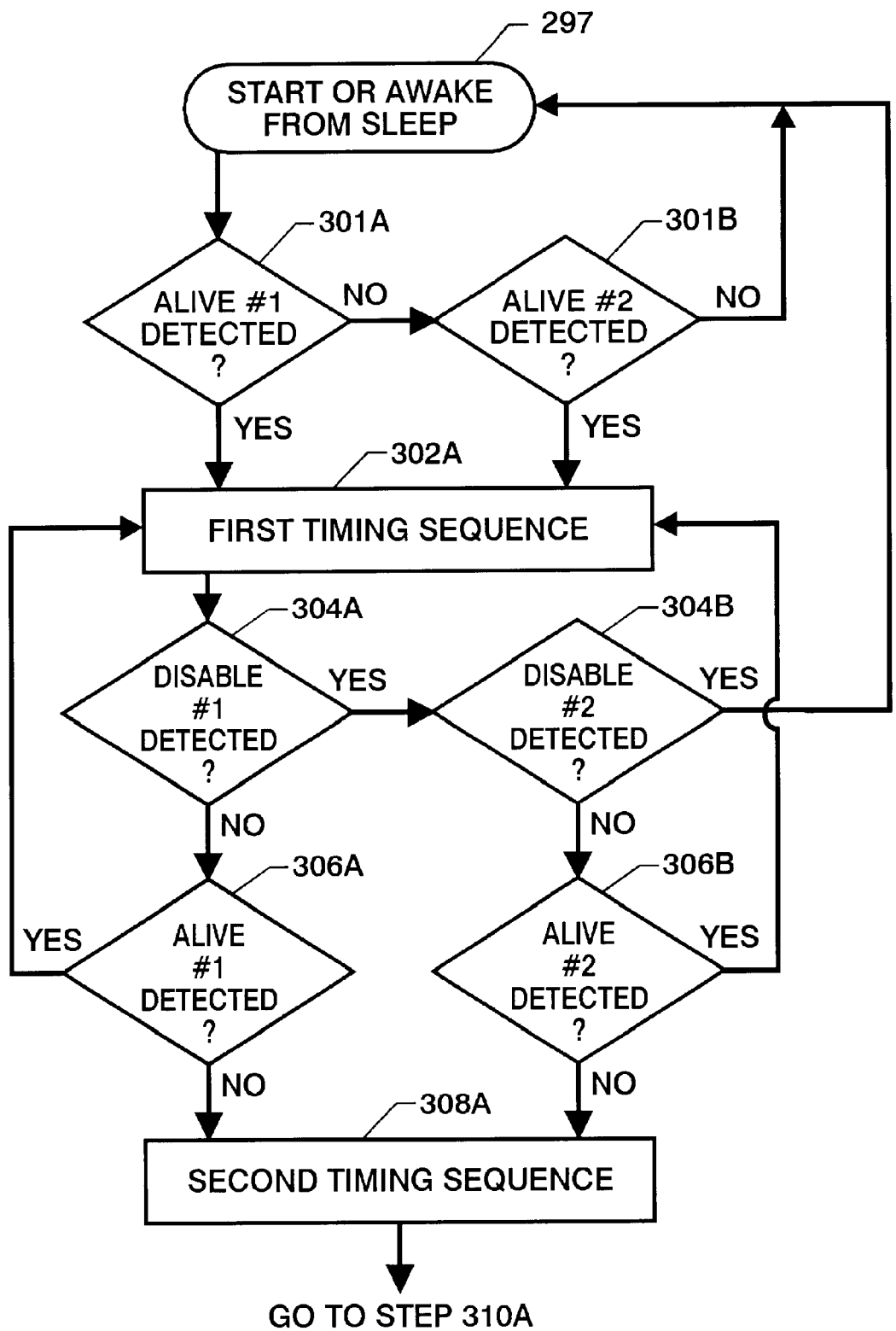
FIGS. 9A–9C are flow diagrams depicting the basic steps carried out by the reception portion of a system when two child safety seats are being monitored.
Figure 9B:
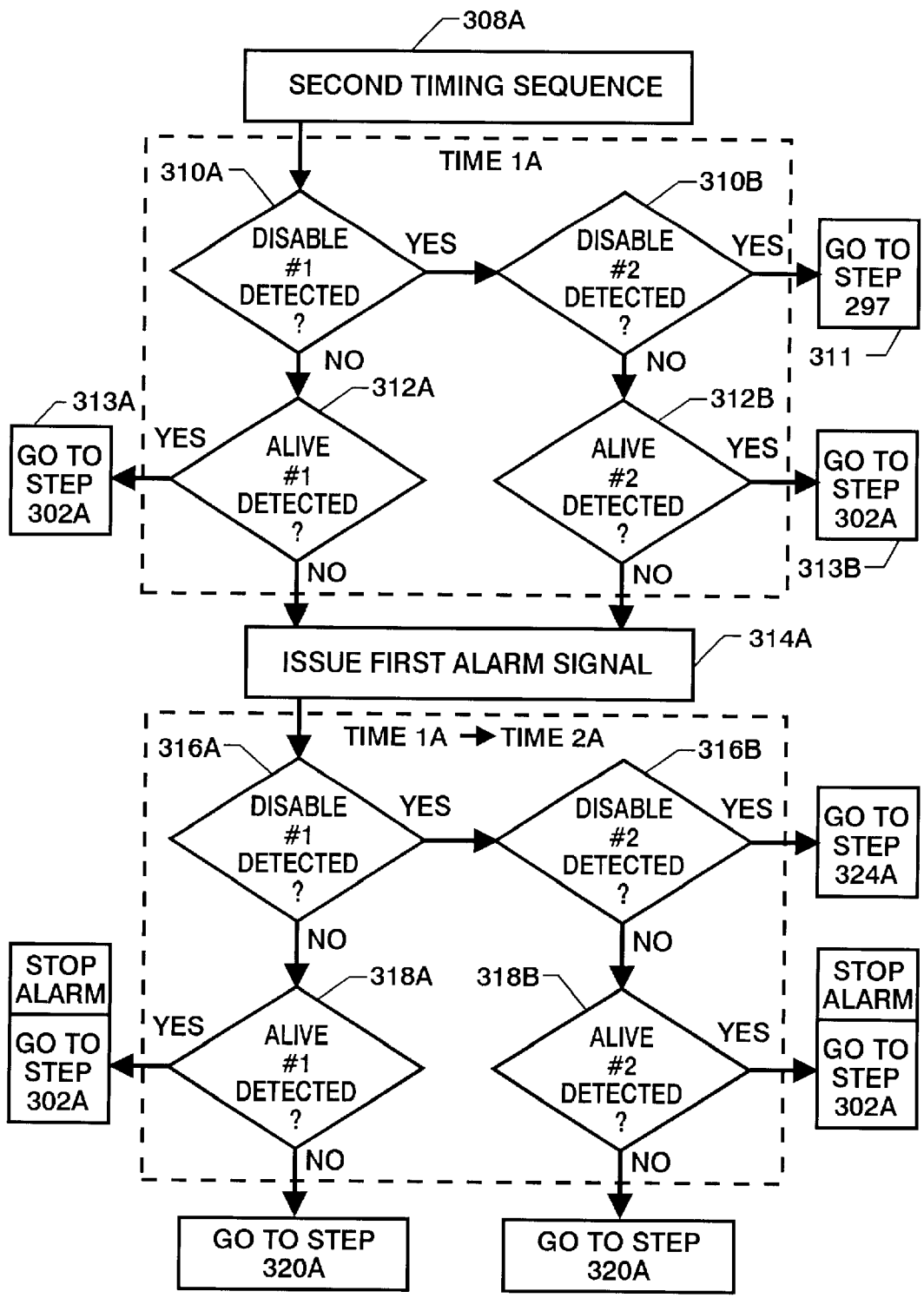
Figure 9C:
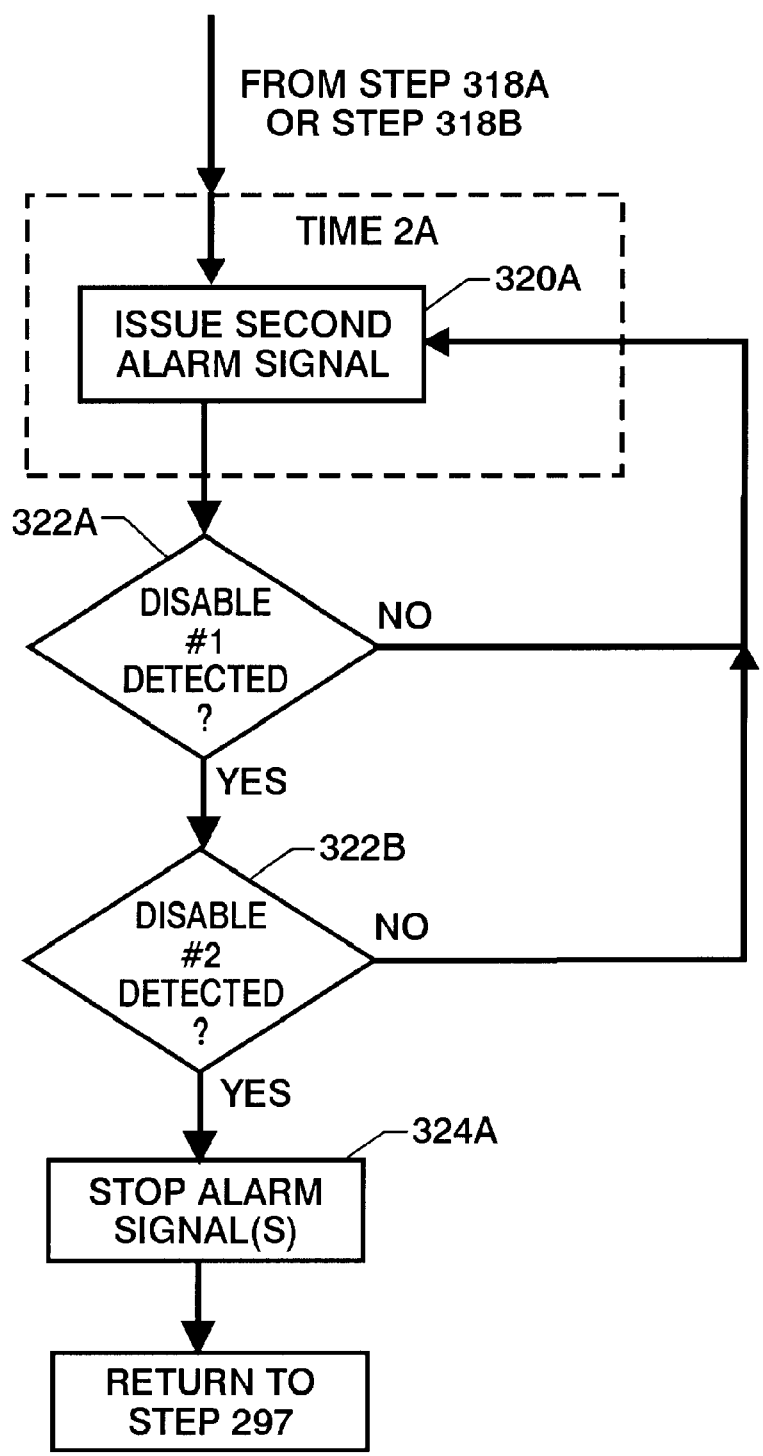

Examples of the signal processing performed by systems 10A and 10B, based on the use of four different signals, are shown in FIGS. 8 and 9A–9C. By way of non-limiting illustrative examples, the system 10A will be explained using two unique wireless signals transmitted by transmitter 26A and two unique or coded wireless signals transmitted by transmitter 26A'. Similarly, system 10B will be explained using four unique or coded wireless signals transmitted by transmitter 26B. In these examples, both systems use a total of four different signals, but the system may use additional signals, such as the third ENABLE signal previously described in FIGS. 5 and 6, and still be within the scope of the invention. FIG. 8 depicts the operation of transmission portions 20A, 20A', and 20B, and FIGS. 9A–9C depict the operation of reception portions 30A and 30B.

Referring first to FIG. 8, controllers 24A and 24A' continuously or periodically (i.e., to save battery power) poll the state of detectors 22A and 22A', respectively, at step 199A. Similarly, controller 24B continuously or periodically (i.e., to save battery power) polls the state of detectors 22B and 22B', respectively, at step 199A. Specifically, the controllers determine the presence or absence of children in the two safety seats. If a child is present in the first safety seat, then controllers 24A and 24B instruct transmitters 26A and 26B, respectively, to transmit an ALIVE #1 signal. This instruction can be issued continuously or periodically (i.e., again to save battery power) at step 202A. If, on the other hand, the first safety seat is unoccupied, the controllers 24A and 24B instruct transmitters 26A and 26B, respectively, to transmit a DISABLE #1 signal at step 206A. This instruction can also be issued continuously or periodically. Once the ALIVE #1 or DISABLE #1 signal has been transmitted, detectors 22A' and 22B' are checked at step 200B. If a child is present in the second safety seat, then controllers 24A' and 24B instruct the transmitters 26A' and 26B, respectively, to transmit, continuously or periodically, an ALIVE #2 signal at step 202B. If, on the other hand, the second safety seat is unoccupied, the controllers 24A' and 24B instruct transmitters 26A' and 26B, respectively, to transmit a DISABLE #2 signal at step 206B. Accordingly, a DISABLE signal is transmitted whenever a safety seat remains unoccupied or when a child has been removed from the safety seat.

Referring now to FIGS. 9A–9C, receivers 32A and 32B work together continuously or periodically with controllers 34A and 34B, respectively, to check for an ALIVE #1 and ALIVE #2 signal beginning at step 297 and proceeding as indicated at steps 301A and 301B. If neither an ALIVE #1 signal at step 301A nor an ALIVE #2 signal at step 301B are detected, the main signal processing steps of reception portions 30A or 30B remain inactive. The main signal processing steps remain inactive because either the receiver is outside the transmission range of the transmitter or both seats are unoccupied. Both of these scenarios presume the caregiver (who has possession of the receiver) has not begun using the system because he or she is not in the vicinity of the transmitter to begin activating the system or because a child is not occupying either seat.

Initial detection of an ALIVE #1 signal (i.e., child placed in the first safety seat) at step 301A or of an ALIVE #2 signal (i.e., child placed in the second safety seat) at step 301B enables a first timing sequence at step 302A. At the conclusion of the first timing sequence (e.g., on the order of 10–60 seconds), receivers 32A and 32B and controllers 34A and 34B operate to check for a DISABLE #1 signal at step 304A and a DISABLE #2 signal at step 304B. Detection of both a DISABLE #1 and a DISABLE #2 signal (indicating that both seats are now unoccupied) causes the first timing sequence to exit and return to the first act of monitoring at step 297.

If the receivers/controllers do not detect a DISABLE #1 signal at step 304A, then they next check for an ALIVE #1 signal at step 306A. If an ALIVE #1 signal is detected, then the first timing sequence repeats itself as the system reverts back to step 302A. This repeated sequence essentially means that the child is in the first safety seat and reception portion 30A or 30B (in possession of the caregiver) is within the predetermined range (e.g., 10–20 feet) of the safety seat. On the other hand, if an ALIVE #1 signal is not detected at the completion of the first timing sequence at step 306A, a second timing sequence is initiated at step 308A. This second timing sequence essentially means that the child is in the first safety seat, but that reception portion 30A or 30B is no longer in range to receive the ALIVE #1 signal. Assuming that the caregiver has maintained possession of the reception portion 30A or 30B, this circumstance also indicates that the caregiver is no longer in the vicinity of the first seat. Therefore, the controller 34A or 34B is passed on to the second timing sequence at step 308A.

If the receivers 32A, 32B and controllers 34A, 34B detect a DISABLE #1 signal at step 304A but do not detect a DISABLE #2 at step 304B, then they next check for an ALIVE #2 signal at step 306B. If an ALIVE #2 signal is detected, then the first timing sequence repeats itself as the system reverts back to step 302A. This repeated first timing sequence essentially means that a child is in the second safety seat and reception portion 30A or 30B (in possession of the caregiver) is within the predetermined range (e.g., 10–20 feet) of the safety seat. On the other hand, if an ALIVE #2 signal is not detected at the completion of the first timing sequence at step 306B, the second timing sequence is initiated at step 308A. Here, this second timing sequence essentially means that a child is in the second safety seat, but that reception portion 30A or 30B is no longer in range to receive the ALIVE #2 signal. Assuming that the caregiver has maintained possession of the reception portion 30A or 30B, this circumstance also indicates that the caregiver is no longer in the vicinity of the second seat. Therefore, the controller 34A or 34B is passed on to the second timing sequence at step 308A.

Referring now to FIG. 9B, step 308A times to a first time (TIME 1A) and then to a later second time (TIME 2A). For example, TIME 1A could occur at 30 seconds and TIME 2A could occur at 1 minute. At TIME 1A, if both the DISABLE #1 signal and the DISABLE #2 signal are detected at steps 310A and 310B, respectively, then the controller 34A or 34B exits the second timing sequence and returns to step 297. This exit of the second timing sequence essentially means that the caregiver has returned to the vicinity of the two safety seats and both seats are now unoccupied. If the receivers/controllers do not detect a DISABLE #1 signal at step 310A, then they next check for an ALIVE #1 signal at step 312A. If an ALIVE #1 signal is detected, then the second timing sequence is exited and the system reverts back to step 302A. This exit of the second timing sequence essentially means that the caregiver has returned to the vicinity of the first safety seat while the seat remains occupied.

If an ALIVE #1 signal is not detected at step 312A, a first alarm signal is issued at step 314A. In terms of system 10A and 10B, controller 34A and 34B issue a control signal to alerting device(s) 36A and 36B, respectively, to produce a first alarm in correspondence with the first alarm signal. The first alarm serves as a pre-warning to the possessor of reception portion 30A or 30B that he or she is out of range of transmission portion 20A or 20B, respectively, during the time that reception portion 30A or 30B is activated. That is, the first alarm indicates that the possessor of reception portion 30A or 30B has left the vicinity of the vehicle and at least one child has been left in at least one safety seat. The pre-warning could, for example, be a series of audible beeps issued by alerting device(s) 36A or 36B.

If the receivers 32A, 32B and controllers 34A, 34B detect a DISABLE #1 signal at step 310A but do not detect a DISABLE #2 at step 310B, then they next check for an ALIVE #2 signal at step 312B. If an ALIVE #2 signal is detected, then the second timing sequence is exited and the system reverts back to step 302A. This exit of the second timing sequence essentially means that the caregiver has returned to the vicinity of the second safety seat while the seat remains occupied. If an ALIVE #2 signal is not detected at step 312B, a first alarm signal is issued at step 314A. Again, the first alarm serves as a pre-warning to the possessor of reception portion 30A or 30B that he or she is out of range of transmission portion 20A or 20B, respectively, during the time that reception portion 30A or 30B is activated. That is, the first alarm indicates that the possessor of reception portion 30A or 30B has left the vicinity of the vehicle and at least one child has been left in at least one safety seat.

After the first alarm signal is issued, the second timing sequence progresses to TIME 2A at step 316A. Reception portion 30A or 30B now continuously or periodically look for a DISABLE #1 signal at step 316A and, if received, a DISABLE #2 signal at step 316B. Detection of both of these signals indicates that the caregiver has returned to the vicinity of the two safety seats and both seats are now unoccupied. The respective controller exits the second timing sequence and proceeds to step 324A, where it stops the first alarm signal and then returns to step 297.

If the receivers/controllers do not detect a DISABLE #1 signal at step 316A, then they next check for an ALIVE #1 signal at step 318A. If an ALIVE #1 signal is detected, then the second timing sequence is exited. The controller (34A or 34B) stops the first alarm signal and the system reverts back to step 302A. This exit of the second timing sequence essentially means that the caregiver has returned to the vicinity of the first safety seat while the seat remains occupied. If an ALIVE #1 signal is not detected at step 318A, a second alarm signal is issued at step 320A. In terms of system 10A and 10B, controller 34A and 34B issue a control signal to alerting device(s) 36A and 36B, respectively, to produce a second alarm in correspondence with the second alarm signal.

If the receivers/controllers do not receive a DISABLE #2 signal at step 316B, then they next check for an ALIVE #2 signal at step 318B. If an ALIVE #2 signal is detected, then the second timing sequence is exited. The controller (34A or 34B) stops the first alarm signal and the system reverts back to step 302A. This exit of the second timing sequence essentially means that the caregiver has returned to the vicinity of the second safety seat while the seat remains occupied. If an ALIVE #2 signal is not detected at step 318B, a second alarm signal is issued at step 320B. In terms of system 10A and 10B, controller 34A and 34B issue a control signal to alerting device(s) 36A and 36B, respectively, to produce a second alarm in correspondence with the second alarm signal.

Referring now to FIG. 9C, once the second alarm issues, it continues at TIME 2A (step 320A) until both a DISABLE #1 signal is detected at step 322A and a DISABLE #2 signal is detected at step 322B, at which point the second alarm signal is stopped at step 324A and control is returned to step 297. Essentially, processing step 320A is executed only if the possessor of reception portion 30A or 30B does not return to the vicinity of the vehicle in response to the (pre-warning) first alarm signal before TIME 2A. Once the second alarm is activated, the system 10A or 10B will disable the second alarm only if the caregiver returns to the safety seat and both seats become unoccupied.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, to secure wooden parts together, whereas a screw employs a helical surface, in the environment of fastening wooden parts, a nail and a screw may be equivalent structures.

What is claimed as new and desired to be secured by Letters Patent of the United States is:

1. A system comprising:
   at least one detector for monitoring the presence of at least one object in a position;
   means, coupled to the at least one detector for transmitting one of a plurality of unique wireless signals to include a first signal when the at least one object is in the position and a second signal when the at least one object is moved from the position; and
   means, remotely located with respect to the transmitting means, for sensing each of said first signal and said second signal, the sensing means having a first timing function and a second timing function,
   said first timing function being enabled when the sensing means senses said first signal, said first timing function timing to a first time interval wherein, at the completion of each said first time interval, the sensing means (i) repeats said first timing function if said first signal is sensed, (ii) disables said first timing function if said second signal is sensed, and (iii) enables said second timing function if neither of said first signal and said second signal is sensed,
   said second timing function, if enabled, timing to a second time interval having a first time and ending at a second time that is later than said first time,
   the sensing means issuing a first alarm signal at said first time if neither of said first signal and said second signal is sensed thereat,
   the sensing means discontinuing said first alarm signal if said first signal is sensed during said second time interval, and
   the sensing means issuing a second alarm signal if said first signal is not sensed during said second time interval, said second alarm signal continuing after said second time until said second signal is sensed.

2. A system as in claim 1 wherein the at least one detector comprises at least one switch that is an open switch whenever the object is not in the position.

3. A system as in claim 2 wherein said at least one switch comprises at least one pressure switch.

4. A system as in claim 1 wherein at least one of said first signal and said second signal is an RF signal.

5. A system as in claim 1 wherein said first signal is an RF signal at a first frequency and said second signal is an RF signal at a second frequency.

6. A system as in claim 1 wherein the transmitting means comprises:
   at least one transmitter capable of generating each of said first signal and said second signal; and
   at least one transmitter controller coupled to the at least one detector and the at least one transmitter for activating the at least one transmitter to generate said first signal when the at least one detector senses that the at least one object is in the position and for activating the at least one transmitter to generate said second signal when the at least one detector senses that the at least one object is moved from the position.

7. A system as in claim 6 wherein the transmitting means further comprises audio means coupled to the at least one transmitter controller for generating an audio output when the at least one detector senses that the at least one object is first placed in the position and when the at least one object is first moved from the position.

8. A system as in claim 7 wherein the transmitting means further comprises a source for supplying power to the at least one transmitter, the at least one transmitter controller, and the audio means.

9. A system as in claim 8 wherein said source is replaceable.

10. A system as in claim 1 wherein the sensing means comprises:
   at least one receiver capable of receiving each of said first signal and said second signal;
   at least one receiver controller coupled to the at least one receiver for (i) implementing said first timing function when said first signal is sensed by the at least one receiver, (ii) disabling said first timing function when said second signal is sensed by the at least one receiver, and (iii) enabling said second timing function if neither of said first signal and said second signal is sensed by the at least one receiver after said first timing function has been enabled; and
   means, coupled to the at least one receiver controller, for generating at least a first alarm in response to said first alarm signal and for generating at least a second alarm in response to said second alarm signal.

11. A system as in claim 10 wherein said first alarm is selected from the group consisting of audible, visible, and tactile alarms.

12. A system as in claim 10 wherein said second alarm is selected from the group consisting of audible, visible, and tactile alarms.

13. A system as in claim 10 wherein the sensing means further comprises a source for supplying power to the at least one receiver, the at least one receiver controller and the means for generating a first and second alarm.

14. A system as in claim 13 wherein said source is replaceable.

15. A system comprising:
   at least one detector for monitoring the presence of at least one object in a position;
   at least one means, coupled to the at least one detector, for transmitting one of a plurality of wireless signals to include a first signal when the at least one object is placed in the position, a second signal while the at least one object remains in the position, and a third signal when the at least one object is moved from the position; and
   means, remotely located with respect to the at least one transmitting means, for sensing each of said first signal, said second signal, and said third signal, the sensing means having a first timing function and a second timing function,
   said first timing function being enabled when the sensing means senses said first signal, said first timing function timing to a first time interval wherein, at the completion of each said first time interval, the sensing means (i) repeats said first timing function if said second signal is sensed, (ii) disables said first timing function if said third signal is sensed, and (iii) enables said second timing function if neither of said second signal and said third signal is sensed,
   said second timing function, if enabled, timing to a second time interval having a first time and ending at a second time that is later than said first time,
   the sensing means issuing a first alarm signal commencing at said first time if neither of said second signal and said third signal is sensed thereat,
   the sensing means discontinuing said first alarm signal if said second signal is sensed during said second time interval, and
   the sensing means issuing a second alarm signal if said second signal is not sensed during said second time interval, said second alarm signal continuing after said second time until said third signal is sensed.

16. A system as in claim 15 wherein the at least one detector comprises at least one switch that is an open switch whenever the object is not in the position.

17. A system as in claim 16 wherein said at least one switch comprises at least one pressure switch.

18. A system as in claim 15 wherein at least one of said first signal, said second signal, and said third signal is an RF signal.

19. A system as in claim 15 wherein said first signal is an RF signal at a first frequency, said second signal is an RF signal at a second frequency, and said third signal is an RF signal at a third frequency.

20. A system as in claim 15 wherein the at least one transmitting means comprises:
   at least one transmitter capable of generating each of said first signal, said second signal, and said third signal; and
   at least one transmitter controller coupled to the at least one detector and the at least one transmitter for activating the at least one transmitter to generate said first signal when the at least one detector senses that the at least one object is placed in the position, for activating the at least one transmitter to generate said second signal while the at least one detector senses that the at least one object remains in the position, and for activating the at least one transmitter to generate said third signal when the at least one detector senses that the at least one object is moved from the position.

21. A system as in claim 20 wherein the at least one transmitting means further comprises audio means coupled to the at least one transmitter controller for generating an audio output when the at least one detector senses that the at least one object is first placed in the position and when the object is first moved from the position.

22. A system as in claim 21 wherein the at least one transmitting means further comprises a source for supplying power to the at least one transmitter, the at least one transmitter controller, and said audio means.

23. A system as in claim 22 wherein said source is replaceable.

24. A system as in claim 15 wherein the sensing means comprises:
   at least one receiver capable of receiving each of said first signal, said second signal, and said third signal;
   at least one receiver controller coupled to the at least one receiver for (i) implementing said first timing function when said first signal is sensed by the at least one receiver, (ii) disabling said first timing function when said third signal is sensed by the at least one receiver, and (iii) enabling said second timing function if neither of said second signal and said third signal is sensed by the at least one receiver after said first timing function has been enabled; and
   means, coupled to the at least one receiver controller, for generating at least a first alarm in response to said first alarm signal and for generating at least a second alarm in response to said second alarm signal.

25. A system as in claim 24 wherein said first alarm is selected from the group consisting of audible, visible, and tactile alarms.

26. A system as in claim 24 wherein said second alarm is selected from the group consisting of audible, visible, and tactile alarms.

27. A system as in claim 24 wherein the sensing means further comprises a source for supplying power to the at least one receiver, the at least one receiver controller, and said means for generating an alarm.

28. A system as in claim 27 wherein said source is replaceable.

29. A system for alerting a caregiver that a child has been left unattended in a safety seat in a vehicle, comprising:
- a detector for monitoring one of presence and absence of the child in the safety seat;
- a transmitter maintained at the vehicle and capable of transmitting a plurality of wireless signals to include at least a first signal and a second signal;
- a receiver for possession by the caregiver and capable of receiving each of said plurality of wireless signals provided said receiver is within a predetermined range of said transmitter;
- a transmitter controller coupled to said detector and said transmitter for monitoring said detector and for activating said transmitter to generate said first signal when said detector senses that the child is in the safety seat and for activating said transmitter to generate said second signal when said detector senses that the child has left the safety seat;
- a receiver controller coupled to said receiver and having a first timing function and a second timing function, said first timing function being enabled when said receiver is within said predetermined range and said first signal is sensed,
- said first timing function timing to a first time interval wherein, at the completion of each said first time interval, said receiver controller (i) repeats said first timing function if said receiver senses said first signal, (ii) disables said first timing function if said receiver senses said second signal, and (iii) enables said second timing function if said receiver senses neither of said first signal and said second signal,
- said second timing function, if enabled, timing to a second time interval having a first time and ending at a second time that is later than said first time wherein, once said second timing function has been enabled, said receiver controller
  - i) issues a first alarm signal at said first time if said receiver is beyond said predetermined range,
  - ii) discontinues said first alarm signal, disables said second timing function and re-starts said first timing function if said receiver is brought back within said predetermined range during said second time interval while the child is in the safety seat, and
  - iii) issues a second alarm signal if said receiver is not brought within said predetermined range during said second time interval, said second alarm signal continuing after said second time until said receiver is brought back within said predetermined range and the child is removed from the safety seat; and
- an audible sound producer coupled to said receiver controller for generating a first audio output in response to said first alarm signal and for generating a second audio output in response to said second alarm signal.

30. A system as in claim 29 wherein said detector comprises at least one pressure switch mounted on the safety seat.

31. A system as in claim 29 wherein at least one of said first signal and said second signal is an RF signal.

32. A system as in claim 29 wherein said first signal is an RF signal at a first frequency and said second signal is an RF signal at a second frequency.

33. A system as in claim 29 further comprising a second audible sound producer coupled to said transmitter controller and maintained in the vehicle for independently generating audio outputs when said detector senses that the child is first placed in the safety seat and that the child is first removed from the safety seat.

34. A system as in claim 29 further comprising:
- a first source for supplying power to each of said transmitter and said transmitter controller; and
- a second source for supplying power to each of said receiver, said receiver controller, and said audible sound producer.

35. A system as in claim 34 wherein each of said first source and said second source is independent of the vehicle and is replaceable.

36. A system as in claim 29 wherein said first audio output and said second audio output are the same.

37. A system as in claim 29 wherein said first audio output and said second audio output are different.

38. A system for alerting a caregiver that a child has been left unattended in a safety seat in a vehicle, comprising:
- a detector for monitoring one of presence and absence of the child in the safety seat;
- a transmitter maintained at the vehicle and capable of transmitting a plurality of wireless signals to include a first signal, a second signal and a third signal;
- a receiver for possession by the caregiver and capable of receiving each of said plurality of wireless signals provided said receiver is within a predetermined range of said transmitter;
- a transmitter controller coupled to said detector and said transmitter for periodically monitoring said detector and for activating said transmitter to generate said first signal only when said detector first senses that the child has been placed in the safety seat, for activating said transmitter to generate said second signal when said detector senses that the child is in the car seat after a transmission of said first signal, and for activating said transmitter to generate said third signal when the child has left the safety seat;
- a receiver controller coupled to said receiver and having a first timing function and a second timing function, said first timing function being enabled when said receiver is within said predetermined range and said second signal is sensed,
- said first timing function timing to a first time interval wherein, at the completion of each said first time interval, said receiver controller (i) repeats said first timing function if said receiver senses said second signal, (ii) disables said first timing function if said receiver senses said third signal, and (iii) enables said second timing function if said receiver senses neither of said second signal and said third signal,
- said second timing function, if enabled, timing to a second time interval having a first time and ending at a second time that is later than said first time wherein, once said second timing function has been enabled, said receiver controller
  - i) issues a first alarm signal at said first time if said receiver is beyond said predetermined range,
  - ii) discontinues said first alarm signal, disables said second timing function and restarts said first timing function if said receiver is brought back within said predetermined range during said second time interval while the child is in the safety seat, and
  - iii) issues a second alarm signal if said receiver is not brought within said predetermined range during said second time interval, said second alarm signal continuing after said second time until said receiver is brought back within said predetermined range and the child is removed from the safety seat; and an audible sound producer coupled to said receiver controller for generating a first audio output in response to said first alarm signal and for generating a second audio output in response to said second alarm signal.

39. A system as in claim 38 wherein said detector comprises at least one pressure switch mounted on the safety seat.

40. A system as in claim 38 wherein at least one of said first signal and said second signal is an RF signal.

41. A system as in claim 38 wherein said first signal is an RF signal at a first frequency and said second signal is an RF signal at a second frequency.

42. A system as in claim 38 further comprising a second audible sound producer coupled to said transmitter controller and maintained in the vehicle for independently generating audio outputs when said detector senses that the child is first placed in the safety seat and that the child is first removed from the safety seat.

43. A system as in claim 38 further comprising:

a first source for supplying power to each of said transmitter and said transmitter controller; and a second source for supplying power to each of said receiver, said receiver controller, and said audible sound producer.

44. A system as in claim 43 wherein each of said first source and said second source is independent of the vehicle and is replaceable.

45. A system as in claim 38 wherein said first audio output and said second audio output are the same.

46. A system as in claim 38 wherein said first audio output and said second audio output are different.

* * * * *